No. 659,638. Patented Oct. 16, 1900.
C. S. BISHOFF.
CREAM SEPARATOR.
(Application filed June 1, 1900.)
(No Model.)
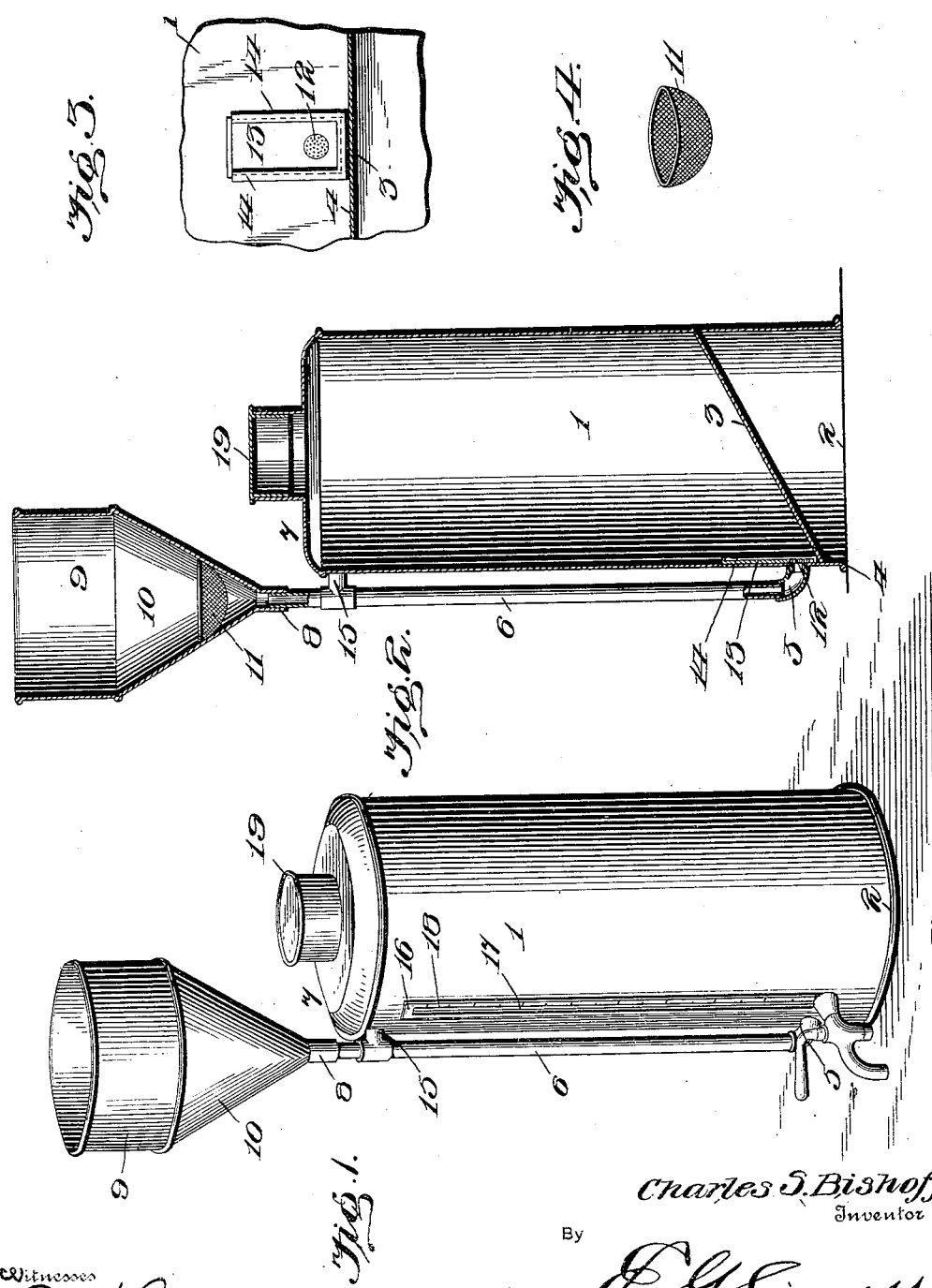

UNITED STATES PATENT OFFICE.

CHARLES S. BISHOFF, OF MARYVILLE, MISSOURI.

CREAM-SEPARATOR.

SPECIFICATION forming part of Letters Patent No. 659,638, dated October 16, 1900.

Application filed June 1, 1900. Serial No. 18,744. (No model.)

*To all whom it may concern:*

Be it known that I, CHARLES S. BISHOFF, a citizen of the United States, residing at Maryville, in the county of Nodaway and State of Missouri, have invented a new and useful Cream-Separator, of which the following is a specification.

My present invention relates to a novel cream-separator, and has for its object to provide a device of this character of simple and inexpensive construction and in which the water is projected into the contained body of milk at its maximum depth. In order that the special utility of the particular construction to be disclosed may be apparent, it may be premised that in order to obtain the best results—that is to say, the complete separation of the milk or cream in a minimum space of time—the cooling fluid or water must be projected into the body of milk and cream only as rapidly as the milk and water will readily mix and in a manner to reduce to the minimum the agitation of the milk. I have found it to be highly desirable, therefore, to provide the can or receptacle which constitutes the separating-chamber with an inclined bottom which serves to give the contained body of milk and cream a regularly-varying depth from one side to the other of the chamber, and into the chamber, adjacent to the lowest point of its bottom, I lead the water, so that the entrance of the water to the separating-chamber will be located at the point of greatest depth of the liquid—that is to say, at that point where the pressure or weight of the imposed liquid is greatest. The water being projected into the chamber horizontally and at the greatest depth of the liquid is intercepted by the inclined bottom, and its direction of movement is so diversified as to overcome the tendency of the inflowing water to agitate the contained body of milk and cream.

The invention therefore consists in providing a separating-chamber with an inclined bottom extending in the same inclined plane throughout, from side to side of the receptacle, and in leading a water-supply pipe or filling-tube from a funnel or reservoir located above the receptacle to a point immediately above the point of lowest elevation of the inclined bottom, where said water-supply pipe or tube is arranged to project the water horizontally into the chamber through a suitable screen, which serves the dual purpose of a regulator for the water-supply and a separator for removing any debris which might otherwise pass with the water into the body of milk.

The invention further consists in certain details of construction and arrangement, all of which will hereinafter more fully appear and which will be illustrated in the accompanying drawings and defined in the appended claims.

In said drawings, Figure 1 is a perspective view of my separator complete. Fig. 2 is a central vertical section therethrough. Fig. 3 is a detail view showing the mounting of the regulator-screen, and Fig. 4 is a detail view of the cup-shaped separator.

Referring to the numerals of reference employed to designate corresponding parts in the several views, 1 indicates a milk can or receptacle which constitutes the separating-chamber of my apparatus. At a slight distance above the bottom 2 of the chamber is located an inclined inner bottom 3, conforming closely to the contour of the receptacle, but inclining at a considerable angle and in a uniform plane from diametrically-opposite sides of the receptacle, so that when the separating-chamber is filled with milk and cream the depth of the contained body of fluid will vary through a considerable degree in accordance with the incline of the bottom 3. Immediately above the lower end 4 of the inclined bottom the wall of the receptacle is pierced by the horizontal lower extremity 5 of a water-supply pipe or filling-tube 6, extending upwardly, preferably substantially parallel with the wall of the receptacle, to a point above the top 7 of the latter, at which point said pipe is led into the depending nipple 8 of a water receptacle or reservoir 9, having a funnel-shaped bottom 10, terminating in the nipple 8, and within which is preferably placed in a manner to be retained by the converging walls of the funnel a cup-shaped or concave screen or separator 11, designed to remove from the water any debris which might otherwise pass through the tube 6 to the interior of the separating-chamber.

The lower or induction end of the pipe 6 is covered by a regulating-screen 12, formed in a slide 13, detachably retained within the receptacle 1 in operative relation to the end of the pipe by short parallel guideways 14 in order that, according to the condition and nature of the water, various regulating-slides provided with regulating-screens of different mesh or sizes of openings may be substituted to secure the proper regulation of the flow of water to obtain the best results. Instead of employing the screen-slide at the lower end of the pipe 6 I may substitute a cup-shaped screen similar to the screen 11, in which case the screen will be slipped directly into the lower end of the pipe or otherwise carried in proper position to regulate the flow of liquid to the separating-chamber.

The pipe 6, adjacent to the top of the receptacle, is preferably retained by a brace 15, extending from the latter and the side of the receptacle adjacent to said pipe—that is to say, at the side of the receptacle having the greatest extent or depth it is provided with a vertical slot 16, covered by a gage-glass 17, retained by inturned flanges 18, soldered or otherwise fixed to the receptacle, said glass being preferably provided with graduations, by means of which the quantity of milk and cream within the separating-chamber may be determined by the elevation of the fluid-level. The top of the receptacle is closed, as usual, by a cap 19.

The operation of my device is as follows: The unskimmed milk is poured into the receptacle or separating-chamber 1, and water at a somewhat-lower temperature is afterward poured into the receptacle 9, from whence it flows through the filling-tube 6 and is projected horizontally into the separating-chamber immediately above the lowest point of the inclined bottom 3, the flow of water being regulated and controlled by the regulating-screen 12. It will be noted that the water is injected at the bottom of the body of liquid, at the point of the greatest depth of the latter, the effect of this particular arrangement being to prevent violent agitation of the contents of the separator-casing by opposing the comparatively-great weight of liquid to the inflowing water at the point of its induction and by intercepting the flow of water by the inclined bottom 3, which breaks the force of the water and causes it to be diffused in various directions in order to prevent the gyratory movement or swirl of the milk and cream, which would otherwise be produced by the inflowing water and which would be inimical to the rapid separation of the cream, which, as is well understood in the art, gradually rises to the surface of the contained body of liquid as the milk is cooled and as its specific gravity is lowered by the introduction of the water.

From the foregoing it will be observed that I have produced a simple, ingenious, and effective cream-separator; but while the present embodiment of my invention is at this time preferable I do not wish to limit myself to the precise details defined, but reserve the right to effect such changes, modifications, and variations as may be comprehended within the scope of the appended claims.

What I claim is—

1. A cream-separator comprising a separating-chamber having an inclined bottom extending in a uniform plane, and a vertically-disposed water-supply tube upon the exterior of the chamber and having a horizontal induction end communicating with the interior of the chamber through an opening in the side wall thereof immediately above the lowest point of the inclined bottom to cause the water supplied to said chamber to be projected horizontally therein directly from the end of the pipe in a direct line toward the side of the chamber at which the bottom attains its greatest elevation, whereby the water being projected directly across the chamber horizontally at the greatest depth of the liquid is intercepted by the inclined bottom to overcome the tendency of the inflowing water to agitate the contained body of milk and cream.

2. In a cream-separator, the combination with a receptacle provided with an inclined bottom extending in a uniform plane, a vertically-disposed water-supply tube upon the exterior of the receptacle and having a horizontal induction end communicating with the interior of the receptacle through an opening in the side wall thereof immediately above the lowest point of the inclined bottom, and a slide located over the opening upon the interior of the receptacle, said slide being provided with a regulating-screen, whereby the inflow of water from the exterior pipe to the interior of the receptacle may be regulated.

In testimony that I claim the foregoing as my own I have hereto affixed my signature in the presence of two witnesses.

CHARLES S. BISHOFF.

Witnesses:
T. A. CUMMINS,
IRA K. ALDERMAN.